United States Patent
Cael et al.

[11] Patent Number: 5,925,289
[45] Date of Patent: Jul. 20, 1999

[54] SYNTHETIC UV-BLEACHED POLARIZER AND METHOD FOR THE MANUFACTURE THEREOF

[75] Inventors: John J. Cael, Upton; Robert L. Jones, Dracut; Rong-Chang Liang, Newton; Giorgio B. Trapani, Cambridge; Tung-Feng Yeh, Waltham, all of Mass.

[73] Assignee: Polaroid Corporation, Cambridge, Mass.

[21] Appl. No.: 08/879,640

[22] Filed: Jun. 20, 1997

[51] Int. Cl.$^6$ .................................. F21V 9/14; G02B 5/30
[52] U.S. Cl. .......................... 252/585; 359/490; 359/491; 359/492
[58] Field of Search .............................. 252/585; 359/490, 359/491, 492

[56] References Cited

U.S. PATENT DOCUMENTS

| | | | |
|---|---|---|---|
| 2,445,555 | 7/1948 | Binda | 350/398 |
| 2,454,515 | 11/1948 | Land | 88/64 |
| 3,658,616 | 4/1972 | Dreyer | 252/585 |
| 4,396,646 | 8/1983 | Schuler et al. | 427/163 |
| 4,466,704 | 8/1984 | Schuler et al. | 350/398 |
| 5,464,669 | 11/1995 | Kang et al. | 428/1 |
| 5,666,223 | 9/1997 | Bennett et al. | |

FOREIGN PATENT DOCUMENTS 56-36612  4/1981  Japan.

OTHER PUBLICATIONS

Schadt, et al.; Photo–Generation of Linearly Polymerized Liquid Crystal Aligning Layers Comprising Novel, Integrated Optically Patterned Retarders and Color Filters; Jpn. J. Appl. Phys. vol. 34 (1995) Pt. 1, No. 6A; pp. 3240–3249.
Freemantle; Polishing LCDs; Dec. 16, (1996); C&EN; pp. 33–37.

*Primary Examiner*—Philip Tucker
*Attorney, Agent, or Firm*—Renato M. de Luna

[57] ABSTRACT

A visible range synthetic light polarizing element is provided, the optical and polarizing properties thereof having been selectively effected by regulated exposure of said polarizing element to ultraviolet irradiation. The ultraviolet irradiation can be either polarized or non-polarized, but in either case, is at intensities greater than that produced incidentally or by ambient ultraviolet irradiation sources. The resultant light-polarizing element is characterized by its heightened luminous transmittance, an improvement accomplished without departure from good polarization efficiency (i.e., greater than 99.9%).

13 Claims, 12 Drawing Sheets

SYNTHETIC UV-BLEACHED POLARIZER AND METHOD FOR THE MANUFACTURE THEREOF

FIELD OF THE INVENTION

The present invention is directed to a highly-efficient visible-range synthetic dichroic polarizer and the method for its manufacture. More particularly, the present invention relates to a synthetic visible-range dichroic polarizer selectively bleached by a regulated exposure to intense ultraviolet irradiation.

BACKGROUND OF THE INVENTION

Normally, light waves vibrate in a large number of planes about the axis of a light beam. Upon reflection off or transmission through certain materials, the waves can be made to vibrate in one plane only, in which case, the light is said to be plane (or linearly) polarized.

While several naturally-occurring materials inherently possess light polarizing properties, synthetic polarizing materials based on thin polymeric films are desirable for their comparative ease of manufacture and handling and their ready ability to be tailored for particular uses. Among the most common synthetic polarizers are dichroic polymers comprising aligned long-chain chromophoric polymer molecules. Light entering such a dichroic polarizer encounters two different absorption coefficients, one low and one high. Light emerges linearly-polarized, vibrating in the direction of the low absorption—a direction generally correspondent with the direction of alignment of the polarizer's chromophores.

The development of such synthetic dichroic polarizers has made practical the widespread utility of light polarizing elements for a variety of applications. For example, in the manufacture of electrooptical devices, such as liquid crystal display screens, a pair of polarizers are used in conjunction with an addressable liquid crystal interlayer to provide the basis for image formation. The pair of polarizers are positioned with either their respective polarizing axes crossed or parallel. Depending on the electrically-selectable molecular orientation of the liquid crystal interlayer, polarized light passed through the first polarizer of the pair can be "twisted" into or out of alignment with the polarizing axis of the second polarizer, thus either blocking or admitting the transit of light therethrough.

Flat panel liquid crystal displays are highly desirable because—in contrast with typical cathode ray tube displays—they occupy less volume, are lighter, and require less power. They can be made quite compact, and thus, highly portable. Still, though good flat panel liquid crystal displays are available, efforts continue in the development of a flat panel liquid crystal display that is inexpensive and durable, yet capable of displaying bright, well-resolved, high contrast images.

In this effort, attention is directed to the influence of the optics and polarizing properties of conventional polarizers on the overall display properties of a liquid crystal display. While polarizing efficiency is needed for good display resolution, the polarizing element used in a liquid crystal display also absorbs some of the light used for image production, thus reducing contrast and dimming the displayed image.

Dimness can of course be countered by more greatly illuminating the display. However, enhancing the brightness of a display's back- or edge-lighting components, for example, can increase power requirements, thus compelling the use of heavier, bulkier batteries. With such compromise to portability being undesirable, an alternative solution would be to employ more efficient polarizing elements, ones that continue to polarize light well, but at greater yields.

Unfortunately, the most direct way to obtain higher efficiencies is to increase the concentration of a polarizer's dichromophore. But, as is well known to those skilled in the art, an increase in dichromophore concentration unavoidably results in a lower photopic transmittance level: Essentially, as polarization efficiency increases, luminous transmittance ($K_v$) decreases.

SUMMARY OF THE INVENTION

It has been found that a more efficient visible range polarizer material can be made by exposing a dichroic light-polarizing polymeric material to ultraviolet irradiation at an intensity and for a duration sufficient to effectively discolor, bleach, or otherwise deactivate certain of the chromophoric components of said light-polarizing material. Different ranges of chromophore—and thus different optical and polarizing properties—can be effected by the nature and conduct of the UV-irradiation induced bleaching. As shown in the examples below, practice of the method can improve the luminous transmittance, $K_v$, of a light-polarizing sheet, while substantially maintaining its nascent polarizing efficiency, E.

In respect of its methodology, practice of the invention commences with the provision of a sheet of amorphous polymeric material, followed by the conversion of said sheet into a light-polarizing dichroic material. Conversion is accomplished by unidirectionally orienting the long-chain molecules of the amorphous polymeric sheet followed (or preceded by) the introduction of dichroic moieties (e.g., polyiodide complexes, polyvinylene, and the like) into said sheet. Preferably left in an unprotected and "un-finished" state, the light-polarizing sheet is then—as stated above—exposed to ultraviolet irradiation. Among other variables, UV-bleaching can be effected with polarized or non-polarized ultraviolet irradiation, or in conjunction with thermal humidity bleaching.

In light of the above, it is an object of the invention to provide a method well-suited for the manufacture of a dichroic light polarizer that has both high polarizing efficiency and high luminous transmittance, said method involving the bleaching of a base dichroic material by regulated exposure to ultraviolet radiation.

It is another object to provide a synthetic polarizing element comprising a dichroic unidirectionally-oriented polymeric sheet that had been irradiated with ultraviolet light at an intensity and for a duration sufficient to have effected bleaching of said polymeric sheet.

It is another object to provide a synthetic polarizing element comprising a dichroic unidirectionally-oriented polymeric sheet bleached by the collective influence of ultraviolet irradiation and prolonged exposure to heat and humidity.

It is another object to provide a synthetic polarizing element comprising a dichroic unidirectionally-oriented polymeric sheet that had been irradiated with linearly-polarized ultraviolet light at an intensity and for a duration sufficient to have effected linear bleaching of said polymeric sheet.

For a fuller understanding of the nature and objects of the present invention, reference should be had to the following detailed description taken in conjunction with the accompanying drawings.

BRIEF DESCRIPTION OF THE DRAWINGS

For a better understanding of the invention as well as other objects and further features thereof, reference can be made to the following detailed description of various embodiments thereof taken in conjunction with the accompanying drawings wherein.

DETAILED DESCRIPTION

The present invention provides a method for making a synthetic visible range dichroic polarizer, the dichroic polarizer having transmission values exceeding the values expected of like conventional polarizers having similar polarizing efficiencies. The method can yield polarizer having improved luminous transmittance, Kv, yet maintain a polarizing efficiency, E, greater than 99.9%. The inventive polarizers—which derive from conventional synthetic polarizers, but are substantially improved by the post-manufacture treatments described herein—are characterized essentially by their comparatively higher polarized light outputs. Hence, when used in a flat panel liquid crystal display, these polarizers can contribute to the accomplishment of brighter sharper images without increasing said display's energy requirements.

The central feature of the method is the irradiation of a light-polarizing dichroic polymeric sheet with ultraviolet light at an intensity and duration sufficient to effect bleaching of said light-polarizing sheet. While practice of the present invention is not limited to any theory used in its explanation, it is believed that UV-effected bleaching destroys or otherwise deactivates the undesired (but inevitably present) unoriented chromophore that block, absorb, or otherwise interfere with polarized light transmitted in the polarizing axis of the polarizer. While it is the goal of most polarizing manufacturing processes to reduce the presence of such unoriented chromophore, none accomplish the task to perfection. The present UV-leaching method, thus provides a post-manufacture methodology for "cleaning up" these undesirable remnants.

Examples of light polarizing sheets that can be improved by incorporating into their manufacture the bleaching methodology include such commercially-available light polarizers as, the H-type and K-type polarizers available from POLAROID CORPORATION, (Cambridge, Mass.), the NPF series of polarizers available from NITTO DENKO (Osaka, Japan); Nichigo OPL polarizing films available from NIPPON GOHSEI (Osaka, Japan); the LC-series of polarizing films available from SANRITZ K.K. (Japan) and the LCD lines of polarizing films available from SUMITOMO (Osaka, Japan), POLATECHNO (Tokyo, Japan), and MITSUI TOATSU (Tokyo, Japan). Reference can also be had to U.S. patent application. Ser. No. 08/565,877, filed by Giorgio B. Trapani, John J. Cael, Narendra S. Kadaba, and Stewart Bennett on Dec. 1, 1995; as well as PCT International Publication Number WO 95/27919 (corresponding to PCT/US95/04260), and PCT International Publication Number WO 97/01/781 (corresponding to PCT/US96/07/654).

While the particular manufacture of the initial base light polarizing sheet is subject to variability, in general, its manufacture will typically involve the unidirectional stretching of an amorphous polymeric sheet, followed or preceded by the introduction of dichroic moieties into said sheet. Typically, stretching is conducted uniaxially at a temperature at or above the glass transition temperature of the polymeric sheet material such that molecules of the sheet become oriented along the axis of the stretch.

The bleaching of the light polarizing sheet can be accomplished with either polarized on non-polarized UV light. However, the two are not casually interchangeable. Given UV-irradiation sources of identical intensities, polarized UV-irradiation (e.g., UV-irradiation passed through a polarizing filter) will produce a polarizer with more precisely enhanced polarizing properties, but typically at a slower rate due to the reduced intensity of the polarized UV-light; whereas non-polarized UV-irradiation will effect a faster rate of bleaching, but with generally less precision (i.e., "less precise" in the sense that a larger number of optical and polarizing variables would be effected).

In respect of bleaching with polarized UV-irradiation, especially where enhancement of transmittance is sought with the least effect on overall polarizing efficiency, it is preferred that the polarizing axis of the UV-irradiation be targeted to correspond with the polarizing axis of the base light polarizing sheet. Since the base light-polarizing sheets used in the present invention are oriented (cf., stretched) polymeric sheets, targeting the polarizing axis of the light-polarizing sheet can be easily accomplished by targeting the orientation direction of the sheet, which in most cases is also correspondent with its length.

Inasmuch as many commercially available light polarizers contain UV-protectants and protective laminates, it will be appreciated that practice of the methods of the present invention cannot be accomplished practically (if at all) using such finished, "off-the-shelf" polarizers. Better practice would require that bleaching be conducted either with a finished but "unprotected" base polarizing material (i.e., unprotected from the effects of ultraviolet irradiation), or at a stage in the manufacture of a UV-protected polarizer prior to the incorporation of UV-protectants. In this manner, the actinic reactions effected by the UV-irradiation are not significantly frustrated or foreclosed, and the process can proceed at more acceptable rates.

Depending on the nature of the base polarizer material being treated and the improved polarizing and optical properties sought, bleaching can take from several minutes to several hours when employing the typical presentlyavailable UV-irradiation sources. To improve the rate of bleaching (and hence the overall rate of manufacture), the base polarizer material can be modified by the incorporations thereinto of rate accelerating additives, such as photosensitizers and photooxidizers. Since different polarizing materials will respond differently to different photosensitizers, for example, the selection of suitable rate accelerators should consider such factors as compatibility, robustness, and environmental resistance, as well as the accelerators' photosensitivity and like actinic properties. For H-Sheet-type and K-Sheet-type polarizers available from POLAROID CORPORATION, examples of additives and sensitizers that can be considered include, but are not limited to, benzophenone derivatives; 2,4-bis(trichloromethyl), 6-phenyltriazine derivatives; Norrish type I, type II, and type III photoinitiators; iodonium and sulfonium salts; peroxides; and inorganic oxidizers, such as salts of transition metals (V, Cr, Mn, Fe, Co, etc.).

As an alternative to the use of additives, the rate of bleaching can also be improved by presensitizing the amorphous polymeric material from which the base light-polarizing sheet is made with a preliminary exposure to UV-radiation. The preliminary exposure can be performed before either the orientation of the amorpohous polymeric material, or before the incorporation of dichroic moieties thereinto. It is believed that the preliminary exposure pre-oxidizes the polymeric components of the amorphous material, introducing carbonyl groups into the backbone thereof, and thus making the polymers more receptive to subsequent bleaching.

Aside from rate accelerating additives, other non-UV-blocking additives can be incorporated to effect the mechanical and/or optical properties of a resultant bleached polarizer. For example, to neutralize the so-called "blue-leak" or "red-leak" of certain dichroic polarizers, one can incorporate a UV-bleachable guest dye of a color complementary to the predominant color "leaked". Because the dye is "bleachable", the dye's effect on the overall transmittance of the base polarizer sheet can be controlled by subsequent UV-bleaching in the same manner employed to control the nascent optical and polarizing properties of said base polarizing sheet, i.e., the sheet without the guest dye. And, although color neutrality is a characteristic highly sought in polarizers employed for color flat panel LCD displays, practice of this particular embodiment of the invention should not be limited to such goal, but rather, extend to encompass any modification to the nascent color profile of the base polarizing sheet.

After bleaching has been conducted to the degree desired, the sensitivity of the bleached polarizer to ultraviolet irradiation can be desensitized or otherwise stabilized from further unwanted bleaching that may occur, for example, as a result of exposure to ambient environmental sunlight. In this regard, the bleached polarizers can be, for example, overcoated with a durable UV-absorptive laminate, layer, other like covering, or itself impregnated, soaked, or otherwise treated with UV-absorptive compounds. Other means of protecting the bleached polarizer will be known to those skilled in the art.

While the UV-bleaching methodology will vary depending on the starting material selected and the particular optical and polarizing properties sought, to facilitate better understanding of the invention, reference is now made to the performance of the methodology in the production of bleached H-Sheet-type and K-Sheet-type polarizers.

Practice of the inventive methodology for the production of UV-bleached H-Sheet-type or K-Sheet-type polarizers starts with a sheet of amorphous polymeric material, and comprises essentially three stages wherein this starting material is processed, these stages being "orientation", "incorporation of dichroic moieties", and "bleaching".

Figure 1:
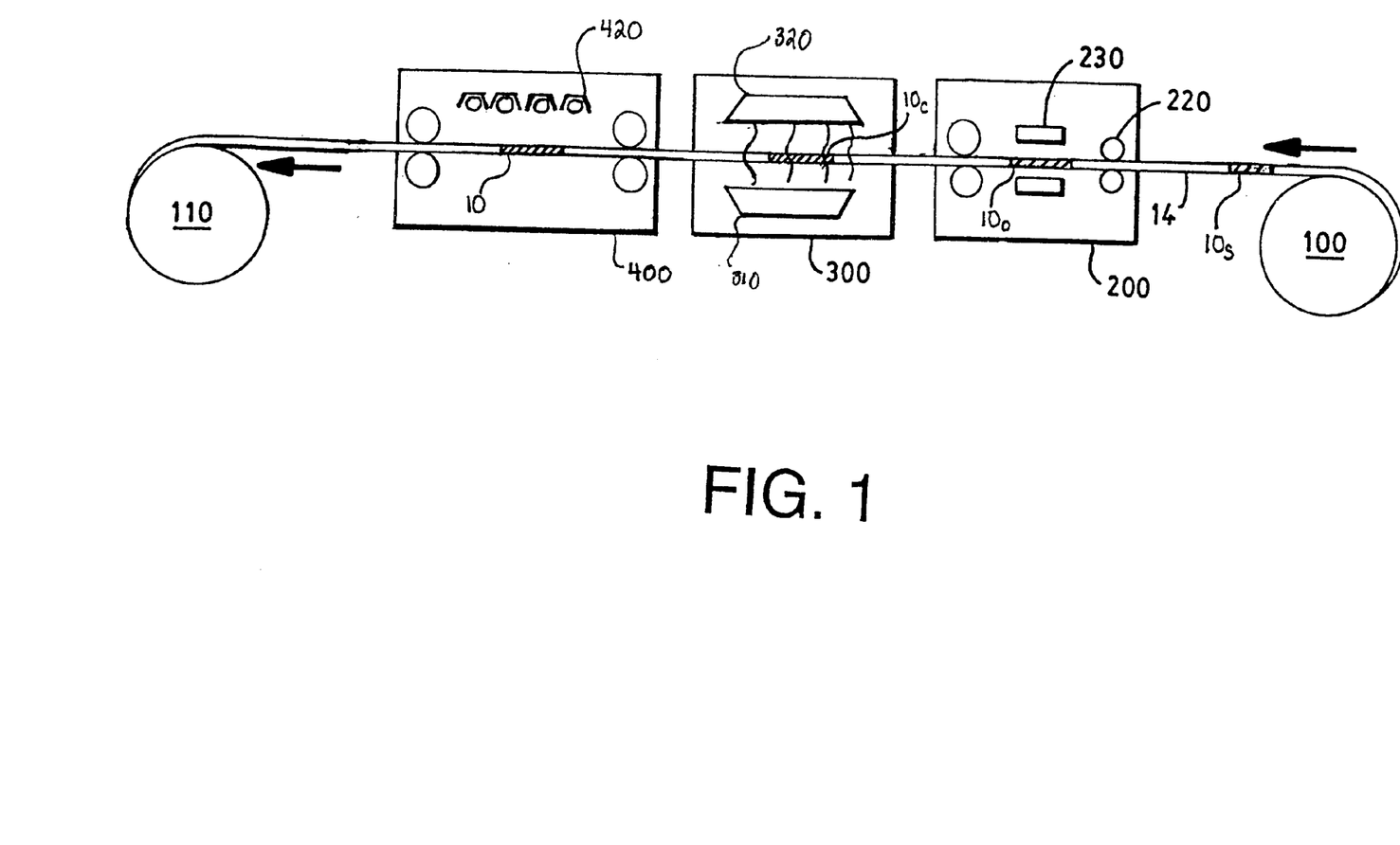
FIG. 1 is a schematic representation of one method for making a synthetic UV-bleached linear light polarizer, the method conducted in accordance with the present invention.

Referring to FIG. 1, "orientation" can be accomplished by a stretching device 200, "incorporation of dichroic moieties" by assembly 300 (which represent either a dye-doping assembly or a catalytic dehydration assembly), and "bleaching" by an ultraviolet exposure unit 400. Although orientation as represented in FIG. 1 occurs before the incorporation of dichroic moieties, the order of these first two steps is not critical to the realization of the principal benefits of the invention. Whether incorporation or orientation comes first, an oriented dichroic material will be made. However, inasmuch as UV-bleaching is performed to effect molecular modification in extant chromophoric species, the step of UV-bleaching must be performed—without foreclosing the possibility of intermediate processing steps—after the completion of both an orientation step and an incorporation step.

As shown in FIG. 1, the manufacture of bleached polarizing sheet 10 commences with the provision of a polymeric sheet of an amorphous hydroxylated linear high polymer $10_S$. In this regard, the polymeric starting material $10_S$ may be selected from any hydroxylated linear high polymer or derivative thereof, or any compound which can be converted into a hydroxylated linear high polymer. Aside from polyvinyl alcohol, the inventors contemplate the use of polyvinyl acetals, polyvinyl ketals, and polyhydroxy alkanes as materials from which the molecularly oriented sheet or film can be formed. The term "acetals and ketals of polyvinyl alcohol" is to be understood as generic to the class of resins formed from polyvinylacetate by the successive or combined steps of hydrolysis and condensation with aldehydes and ketones, respectively. In any event, despite the broad range of materials that can be employed, polyvinyl-alcohol (PVA)—owing to its ready availability and well-known properties—is preferred. It should be pointed out however, that when the invention is practiced with mixed polymers or derivatives of polyvinyl alcohol for the production of bleached K-Sheet-type polarizers, incomplete derivatives should be used; i.e., some of the hydroxyl groups of the polyvinyl alcohol should remain unreacted in order to enter into a subsequent esterification reaction.

The polymeric sheet $10_S$ is transported to a suitable stretching device 200 (or other like mechanisms or systems), whereupon the amorphous unprocessed polymeric sheet $10_S$ is unidirectionally stretched. The polyvinylalcohol material used according to the invention is typically from about 0.038 to about 0.051 mm in thickness and preferably about 0.046 mm thick. The sheet is initially stretched uniaxially to between about 2.5 to about 3.6 times. An initially 0.046 mm thick, 940 mm wide, polyvinyl alcohol sheet stretched to approximately 3.6 times its normal dimensions obtains a thickness of about 0.025 mm and a width of about 533 mm. In embodiments where it is desired to make a highly efficient polarizer material having uniform polarizing and optical properties, an approximately 254 mm wide strip is taken from the center of the sheet and used in further processing.

This stretching step—effecting molecular orientation of the amorphous polymeric material—is generally conducted under the influence of moderate heat, preferably at a temperature at or above the glass transition temperature of the amorphous polymeric material, particularly, in a hot air oven heated to a temperature of about 125° C. As indicated in FIG. 1, stretching can be effected in hot air oven 200 by the provision therein of heat generating elements 230, fast rollers 210, and slow rollers 220. Difference in the rotational rate between rollers 210 and 220 are exploited to create corresponding tension in the area of web 14 transported therebetween. When said area is submitted contemporaneously to heat emitted by heat generating elements 230, stretching of web 14 is facilitated and more desirably effected. Other methods for stretching sheet 10$_S$ will be apparent to those skilled in the art in light of the present disclosure. Methods for stretching polymeric sheets are described in such patents as U.S. Pat. No. 2,547,736, issued to R. Blake, U.S. Pat. No. 2,547,763, issued to Edwin H. Land and W. Ryan, and U.S. Pat. No. 2,804,652, issued to S. Balkan.

Subsequent to stretching, the oriented polymeric sheet 10$_O$ assumes a somewhat fibrous nature and its tensile strength in the direction transverse to the stretch direction is diminished. In this state, the oriented polymeric sheet 10$_O$ is susceptible to wrinkling, creasing, and other like physical artifacts resultant of handling and manipulation. Accordingly, the oriented polymeric sheet 10$_O$ can be protected by the bonding or lamination thereonto of a carrier web (e.g., an approximately 0.127 mm thick cellulose triacetate film). However, to the extent that a carrier web (not shown) may interfere with subsequent UV-bleaching steps, it may be desirable to laminate the carrier web onto the side of the oriented polymeric sheet 10$_O$ opposite the intended exposure surface. Or, alternatively—assuming that the oriented polymeric sheet can be handled reasonably well without a supporting web—the web may be omitted altogether.

If a carrier web is to be used, any of a variety of materials can be used. Suitable carrier web materials include known polymeric sheet materials such as the cellulose esters (e.g., nitrocellulose, cellulose acetate, cellulose acetate butyrate), polyesters, polycarbonates, vinyl polymers such as the acrylics, and other support materials that can be provided in a sheet-like, light-transmissive form. Polyesters are especially useful, depending on the particular application and the requirements thereof. A preferred polyester is polyethylene terephthalate, available under the Mylar and Estar tradenames, although other polyethylene terephthalate materials can be employed. The thickness of the support material will vary with the particular application. In general, from the standpoint of manufacturing considerations, supports having a thickness of about 0.5 mil (0.013 mm) to about 20 mils (0.51 mm) can be conveniently employed.

Any of a variety of adhesives can be used for the lamination including polyvinyl alcohol adhesives and polyurethane adhesive materials. Inasmuch as the polarizer will normally be employed in optical applications, an adhesive material which does not have an unacceptable effect on the light transmission properties of the polarizer will generally be employed. The thickness of the adhesive material will vary with the particular application. In general, thicknesses of about 0.25 mil (0.006 mm) to about 1.0 mil (0.025 mm) are satisfactory.

After orienting the amorphous polymeric sheet 10$_S$ the resultant oriented polymeric sheet 10$_O$ is transported to assembly 300 wherein dichroic moieties are introduced into said sheet, producing chromophoric species. The principal way in which dichroic moieties are introduced are by either dye-doping (in the case of H-Sheet-type polarizers) or by catalytic dehydration (in the case of K-Sheet-type polarizers).

In the case of H-Sheet-type polarizers, the stainable oriented sheet material 10$_S$ can be stained according to known methods using a dichroic substance such as a dichroic dye or other dichroic stain. An example of a highly suitable dichroic substance is a dichroic stain comprising iodine and an iodide salt such as potassium iodide. The web of stainable sheet material 10$_S$ can be passed through a tank (cf, assembly 300) supplying the iodine/iodide staining composition. The composition of the iodine staining composition is preferably iodine, potassium iodide and water, preferably in a ratio of 1/237/3727 by weight. The solution is maintained at a temperature of about 30° C.±2° and is generally recirculated by heating and recirculating means 310 and 320.

The rate of travel through the staining tank 300 and the residence time therein are selected so as to permit the polyvinylalcohol to become swollen substantially throughout its thickness and to permit the stain to penetrate into the sheet to a substantial extent, desirably, from both surfaces. Generally, the stain will penetrate about one-third of the sheet thickness from each surface.

In the case of K-Sheet-type polarizers, the oriented polymeric sheet 10$_O$ can be rendered dichroic by conversion of the polyvinyl alcohol by catalytic dehydration into the chromophoric species, polyvinylene, see e.g., U.S. Pat. No. 2,445,555 (issued Jul. 20, 1948 to F.J. Binda). For example, a K-Sheet-type polarizer can be made by dehydrating an oriented sheet of polyvinyl alcohol; particularly, by heating it in the presence of a very strong acid catalyst, such as fuming hydrochloric acid, liberating water molecules and producing conjugated blacks of polyvinylene. Alternatively, an amorpohous polymeric sheet can be first dehydrated. Then, to effect the desired anisotropic property, the dehydrated sheets can be unidirectionally stretched, aligning the conjugated polyvinylene blocks and orienting the dichroic moments thereof. Characterized by hydrophobicity (and inherent stability), a base K-Sheet-type polarizer would be advantageous in the manufacture of a bleached polarizer used for applications involving exposure to high temperatures, wide temperature fluctuations, and extreme variations in humidity. The manufacture of a particularly suitable high-efficiency K-Sheet-type polarizer is described in the aforementioned U.S. patent application Ser. No. 08/565,877.

As shown in FIG. 1, after amorphous polymeric sheet is processed into base light-polarizing sheet 10$_C$, the base light-polarizing sheet is then transported to ultraviolet exposure unit 400, which comprises an array 420 of ultraviolet-emitting lamps. Mercury lamps having an emission in the range of 200 nm to 400 nms are suitable, although other sources of UV radiation can be employed.

Inasmuch as bleaching rate is a function of exposure intensity, the greater its intensity, the more generally desirable the lamp. A particular example of a suitable lamp would be a water-cooled 450 W medium pressure mercury lamp. In instances where bleaching is to be conducted with polarized ultraviolet radiation, the lamp can be fitted with ultraviolet light polarizing filters, such as those available from Sterling Optics, Inc. In bleaching light-polarizing sheet 10$_C$, the intensity of the exposure should be in the order of at least 0.01 milliwatts/cm$^2$. The conduct of and variation on UV-bleaching are discussed above.

Although not shown in FIG. 1, in addition to UV-bleaching, the light-polarizing sheet 10$_C$ may also be bleached by exposure to elevated heat and humidity. In this regard, it will be appreciated that UV-bleaching tends to effect long-wavelength absorbing chromophore more than short-wavelength absorbing chromophore, with the result that the entire spectrum of a bleached polarizer is shifted from red to blue as these longer chain chromophore degrade into shorter-wavelength absorbing chromophore. Further, upon passing a peak in the improvement of polarizing and optical properties, prolonged UV-bleaching can result in decreasing polarizing efficiency, and without further gains in the transmittance, particularly of short wavelengths (i.e., 400 to 500 nm).

Aside from UV-bleaching, dichroic materials can also be bleached by prologed exposure to elevated heat and humidity. For example, prolonged exposure to a 60° C./90% RH (relative humidity) environment can increase the transmittance of an HN-type polarizer from 36% to 41%, and its efficiency from 99.4% to 99.6%. However, heat and humifity bleaching tends to effect short-wavelength absorbing chromophore more than long-wavelength absorbing chromophore, resulting in the propensity of the procedure to produce polarizers exhibiting so-called "blue leak".

In view of the complementary effects accomplished by UV and "heat and humidity" bleaching, advantage can be gained by combining the two bleaching processes. More particularly, in an embodiment of the present invention, a light-polarizing sheet can be bleached initially by prolonged exposure to elevated heat and humidity, then—to resolve any resulting blue-leak issues—bleached by exposure to ultraviolet radiation.

It will, of course, be apparent that the bleached polarizers of the present invention may be laminated between or to supporting sheets or films, such as sheets of glass or sheets of other organic plastic materials, and that said polarizers, either in laminated or unlaminated form, may be employed wherever other forms of light-polarizing plastic materials have heretofore been used, for example, in connection with liquid crystal display panels, sunglasses, sun visors, window pane glass, CRT-monitor glare elimination systems, advertising displays, glare masks, and room partitions.

To further illustrate the present invention, the following Examples are provided, but the present invention is not to be construed as being limited thereto. Unless otherwise indicated, all parts, percents and ratios are by weight. In the Examples, $K_1$ is the major principal transmittance of a linear polarizer; defined as the ratio of transmitted light intensity to incident intensity when the incident beam is linearly polarized in that vibration azimuth which maximizes the transmittance, i.e., parallel.

$K_2$ is the minor principal transmittance of linear polarizer; that ratio obtained when the transmittance is minimized, ie., perpendicular.

Kv is the average of the principal transmittances, and is calculated using the following formula:

$$Kv = \frac{1}{2}(K1+K2)$$

E (Efficiency) is a measure of polarizing performance defined as the ratio of the difference of the principal transmittances to the sum of the principal transmittances and is calculated using the following formula:

$$E = (K1-K2)/(K1+K2)$$

Dichroic ratio, $D_R$—i.e., photopic dichroic ratio—is used hereinbelow as an overall measure of the polarizing and optical properties of the film and is defined as the ratio of absorption of a film pair in perpendicular orientation to the pair's absorption in parallel orientation. The reported dichroic ratios are corrected for reflection.

EXAMPLES

Examples 1 to 16

A free-standing polarizing sheet HN38 (i.e., an iodine dye-doped polarizing layer supported on one-side by a cellulose triacetate base and available from POLAROID CORPORATION) was obtained. Several samples of the polarizing sheet were exposed to UV-irradiation for varying duration, as shown in the table below, to produce Examples 1 to 16. Exposure was effected by the employment of a water-cooled 450 W medium-pressure mercury lamp, wherein a 5 minutes exposure to its UV-irradiation produced an equivalent of approximately 2430.4 mJ/cm$^2$. The samples were then analyzed for polarizing and other like optical properties. The data collected is presented in the following table.

| | Time (min) | $K_1$ | $K_2$ | E | $K_v$ | $D_R$ |
|---|---|---|---|---|---|---|
| Control (HN38) | 0 | 0.722 | 0.00254 | 99.30 | 36.23 | 24.31 |
| Example 1 | 5 | 0.737 | 0.00242 | 99.35 | 36.97 | 26.79 |
| Example 2 | 10 | 0.754 | 0.00239 | 99.37 | 37.82 | 29.92 |
| Example 3 | 15 | 0.765 | 0.00241 | 99.37 | 38.37 | 32.22 |
| Example 4 | 20 | 0.777 | 0.00244 | 99.37 | 38.97 | 35.12 |
| Example 5 | 25 | 0.785 | 0.00244 | 99.38 | 39.37 | 37.38 |
| Example 6 | 30 | 0.787 | 0.00244 | 99.38 | 39.47 | 37.99 |
| Example 7 | 35 | 0.794 | 0.00247 | 99.38 | 39.82 | 40.19 |
| Example 8 | 40 | 0.797 | 0.00225 | 99.44 | 39.96 | 41.90 |
| Example 9 | 45 | 0.800 | 0.00231 | 99.42 | 40.12 | 42.84 |
| Example 10 | 50 | 0.802 | 0.00234 | 99.42 | 40.22 | 43.52 |
| Example 11 | 55 | 0.804 | 0.00251 | 99.38 | 40.33 | 43.81 |
| Example 12 | 60 | 0.807 | 0.00262 | 99.35 | 40.48 | 44.72 |
| Example 13 | 65 | 0.812 | 0.00279 | 99.32 | 40.74 | 46.43 |
| Example 14 | 70 | 0.814 | 0.00291 | 99.29 | 40.85 | 47.02 |
| Example 15 | 75 | 0.816 | 0.00312 | 99.24 | 40.96 | 47.40 |
| Example 16 | 80 | 0.817 | 0.00349 | 99.15 | 41.02 | 46.95 |

Figure 2A:
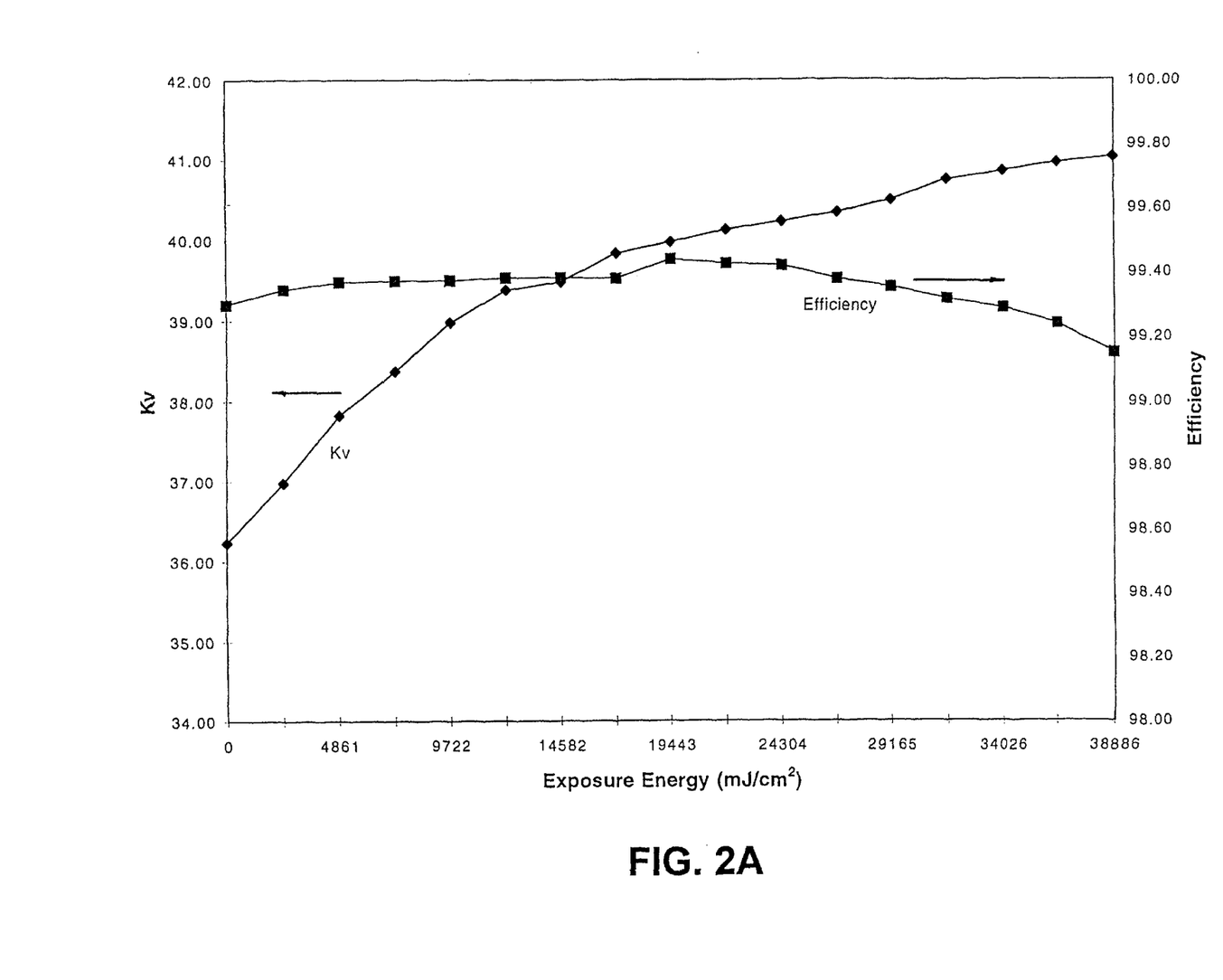
FIGS. 2A to 2D are graphs representing the optical and polarizing properties of several UV-bleached H-type polarizers, wherein bleaching is effected by exposure to polarized ultraviolet irradiation.
Figure 2B:
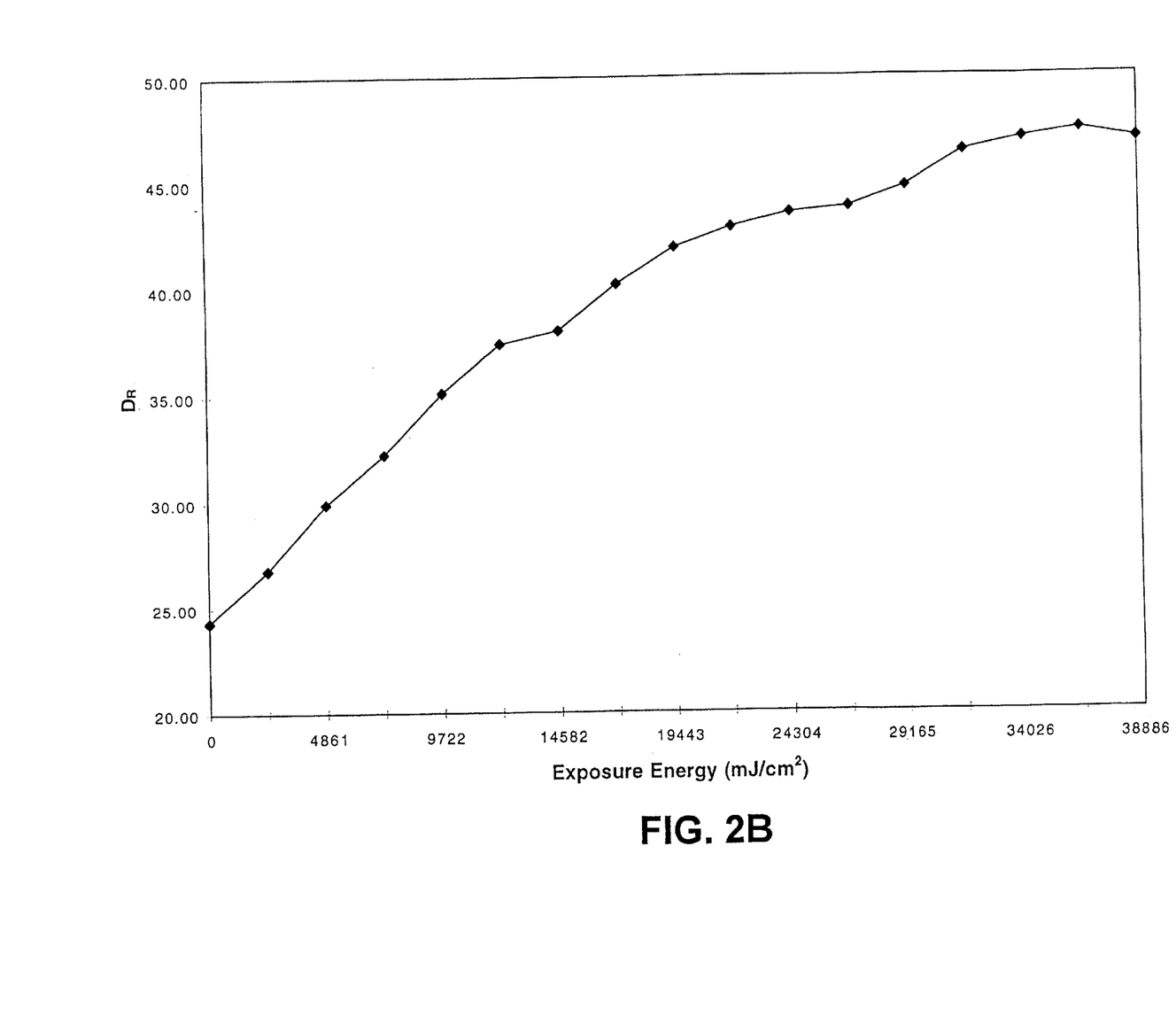
Figure 2C:
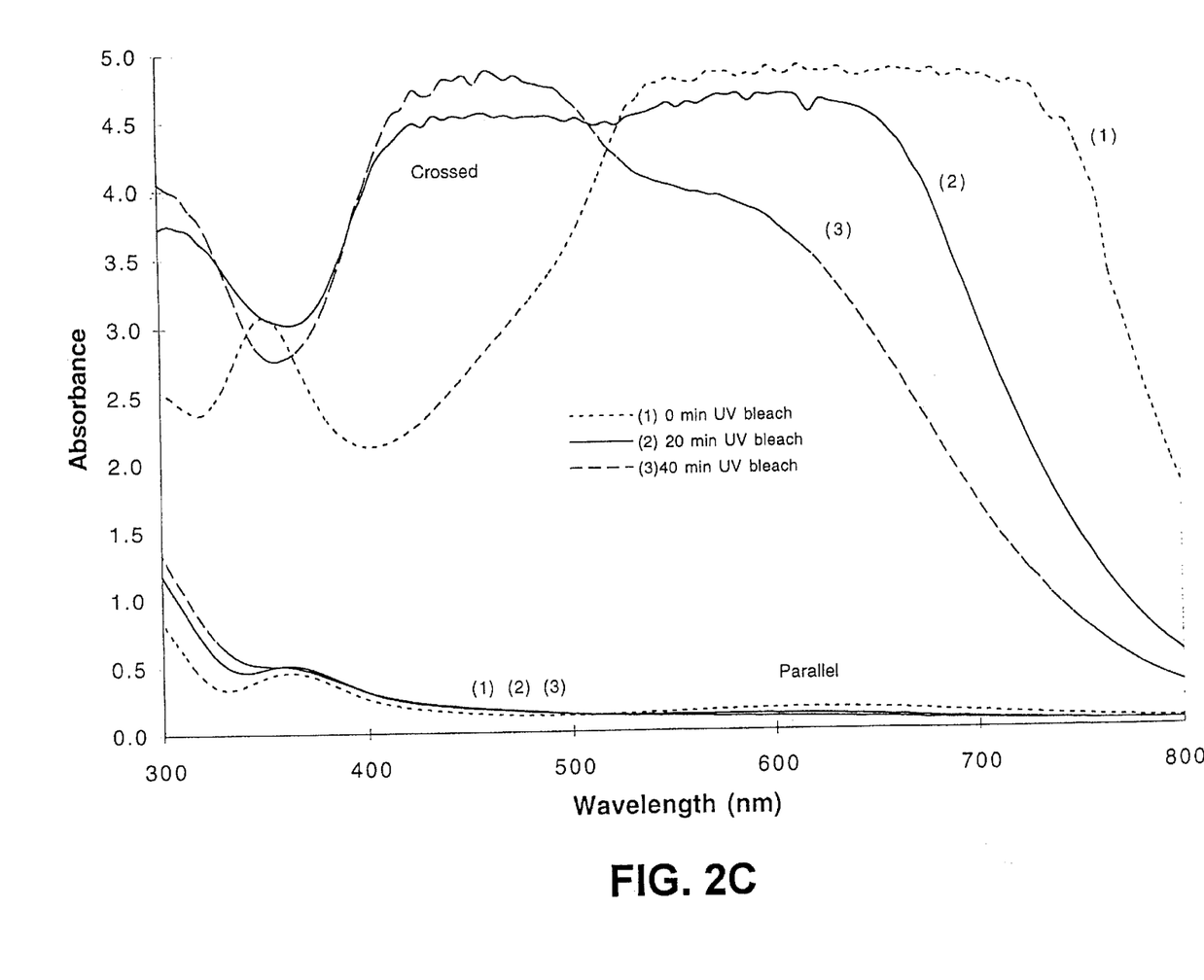
Figure 2D:
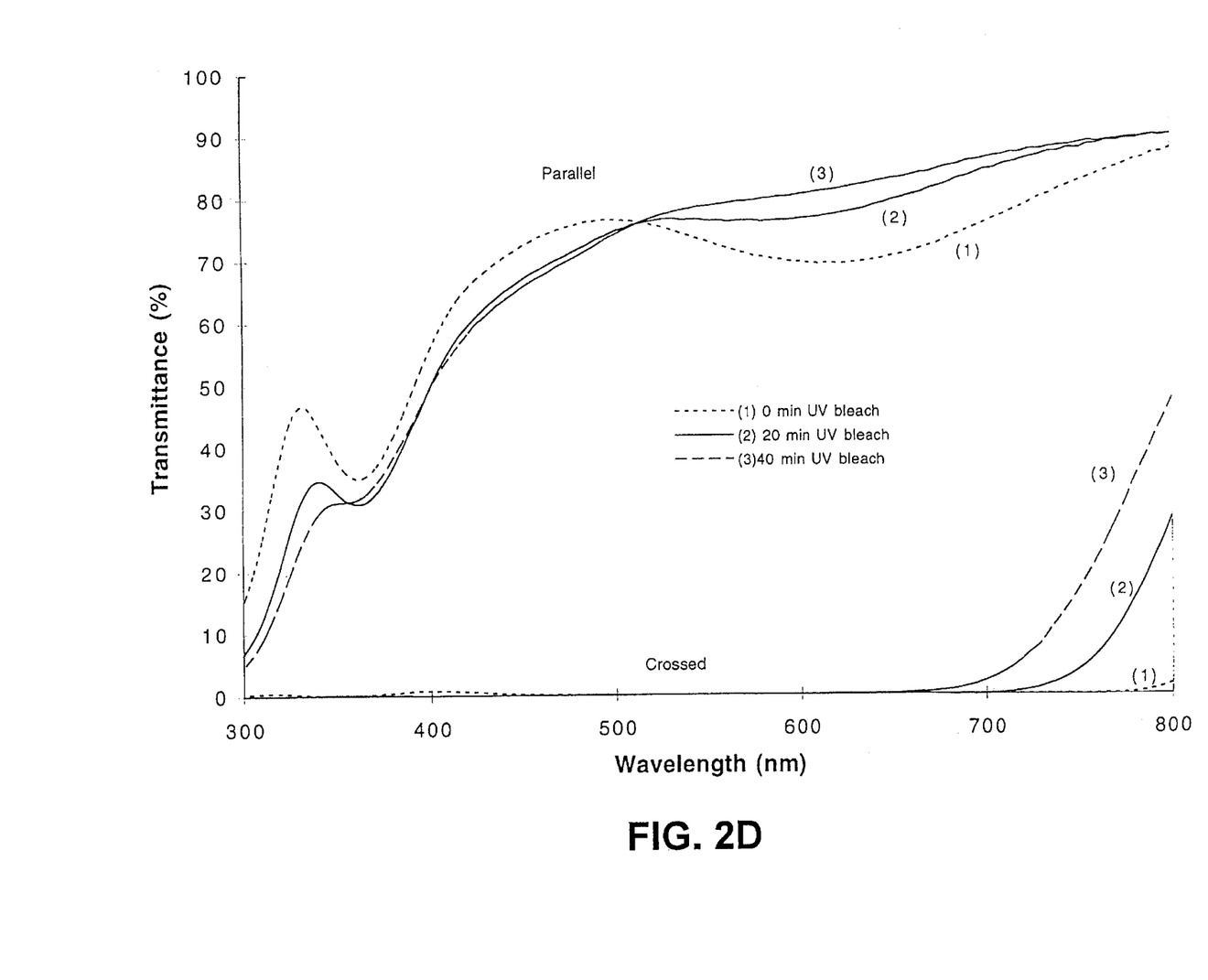

The data in the above table is also plotted in the graphs set forth in FIGS. 2A and 2B. As can be observed from the table and FIGS. 2A and 2B, the transmittance and dichroic ratio of the samples increased with increasing duration of exposure. The polarizing efficiency of samples peaked at 99.44% following an exposure of approximately 40 minutes. The data suggest that UV-irradiation bleaching can increase the transmittance of a dichroic polarizer without reducing polarizing efficiency when the duration of exposure is controlled. Also, as shown in FIGS. 2C and 2D, UV-irradiation can shift the absorbance spectrum of a dye-doped polarizer from red to blue with an increase in overall transmittance, thus, allowing for the possibility of using UV-irradiation to "fine tune" the perceived color of dichroic polarizers.

Examples 17 to 23

A free-standing polarizing sheet HN38 (i.e., an iodine dye-doped polarizing layer supported on one-side by a cellulose triacetate base and available from POLAROID CORPORATION) was obtained. Several samples of the polarizing sheet were exposed initially to non-polarized UV-irradiation for 20 minutes, then exposed to either (1) non-polarized UV-irradiation or (2) to polarized UV-irradiation at an incident angle of 70°. Exposure in all instances was effected by a water-cooled 450 W medium-pressure lamp, however, for the polarized exposure, the lamp was fitted with two parallel 105 UV polarizing filters obtained from Sterling Optics, Inc. The two UV polarizing filters, when placed together with their polarizing axes parallel, had an efficiency of 99.58%, 99.55%, 99.44% and 99.46%; and a transmittance of 2.60%, 5.55%, 8.43% and 12.74%; at 250, 270, 300, 340 nm; respectively. The samples were then analyzed for polarizing and other like optical properties. The data collected is presented in the following tables and in FIGS. 3A and 3C.

|  | 2nd exposure | Kv | E | $D_R$ |
|---|---|---|---|---|
| Example 17 | 0 (control) | 39.96 | 99.44 | 41.90 |
| Example 18 | 2500 non-polarized | 40.12 | 99.42 | 42.84 |
| Example 19 | 5000 non-polarized | 40.22 | 99.42 | 43.52 |
| Example 20 | 7500 non-polarized | 40.33 | 99.38 | 43.81 |
| Example 17 | 0 (control) | 38.03 | 99.59 | 33.20 |
| Example 21 | 2500 polarized | 38.39 | 99.60 | 33.89 |
| Example 22 | 5000 polarized | 38.48 | 99.61 | 35.55 |
| Example 23 | 7500 polarized | 38.62 | 99.61 | 36.37 |

|  | 2nd exposure | Kv (normalized) | E (normalized) | $D_R$ (normalized) |
|---|---|---|---|---|
| Example 17 | 0 (control) | 1 | 1 | 1 |
| Example 18 | 2500 non-polarized | 1.0040 | 0.9998 | 1.0224 |
| Example 19 | 5000 non-polarized | 1.0065 | 0.9998 | 1.0386 |
| Example 20 | 7500 non-polarized | 1.0093 | 0.9994 | 1.0456 |
| Example 17 | 0 (control) | 1 | 1 | 1 |
| Example 21 | 2500 polarized | 1.0095 | 1.0001 | 1.0208 |
| Example 22 | 5000 polarized | 1.0118 | 1.0002 | 1.0708 |
| Example 23 | 7500 polarized | 1.0155 | 1.0002 | 1.0955 |

Figure 3A:
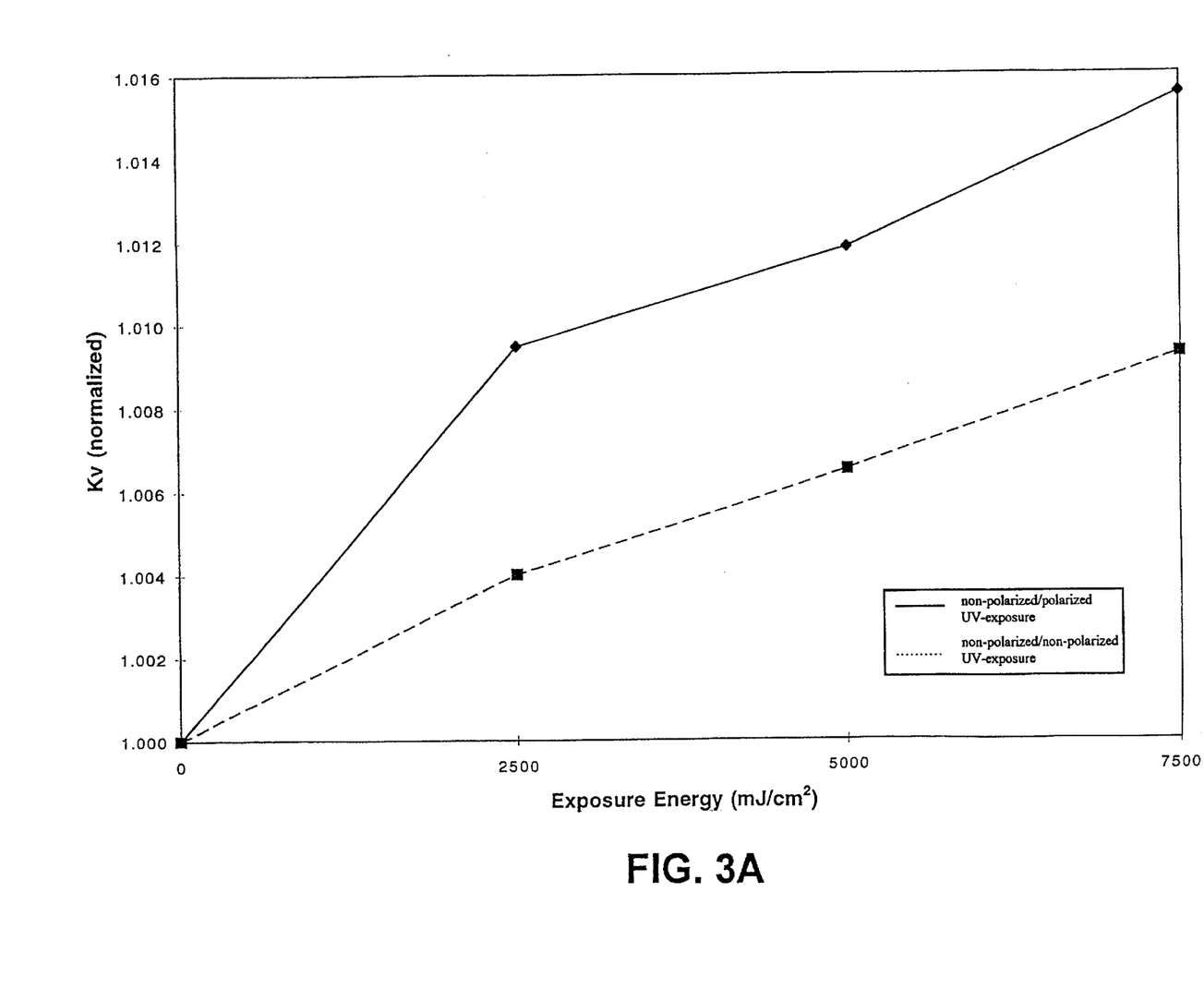
FIGS. 3A to 3C are graphs representing the optical and polarizing properties of several UV-bleached H-type polarizers, wherein bleaching is effected by an initial exposure to non-polarized ultraviolet irradiation followed by a second exposure to either polarized or non-polarized ultraviolet irradiation.
Figure 3B:
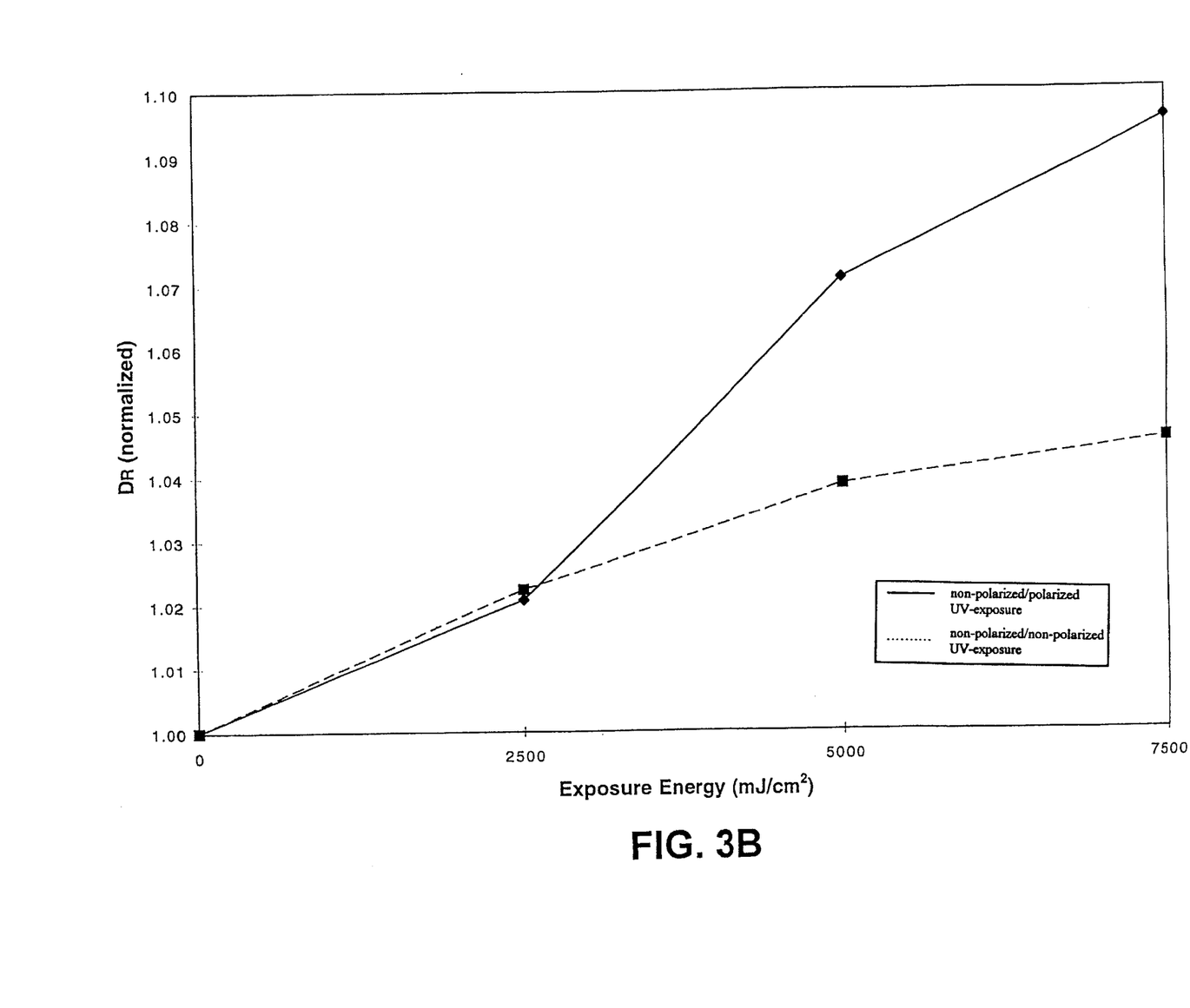
Figure 3C:
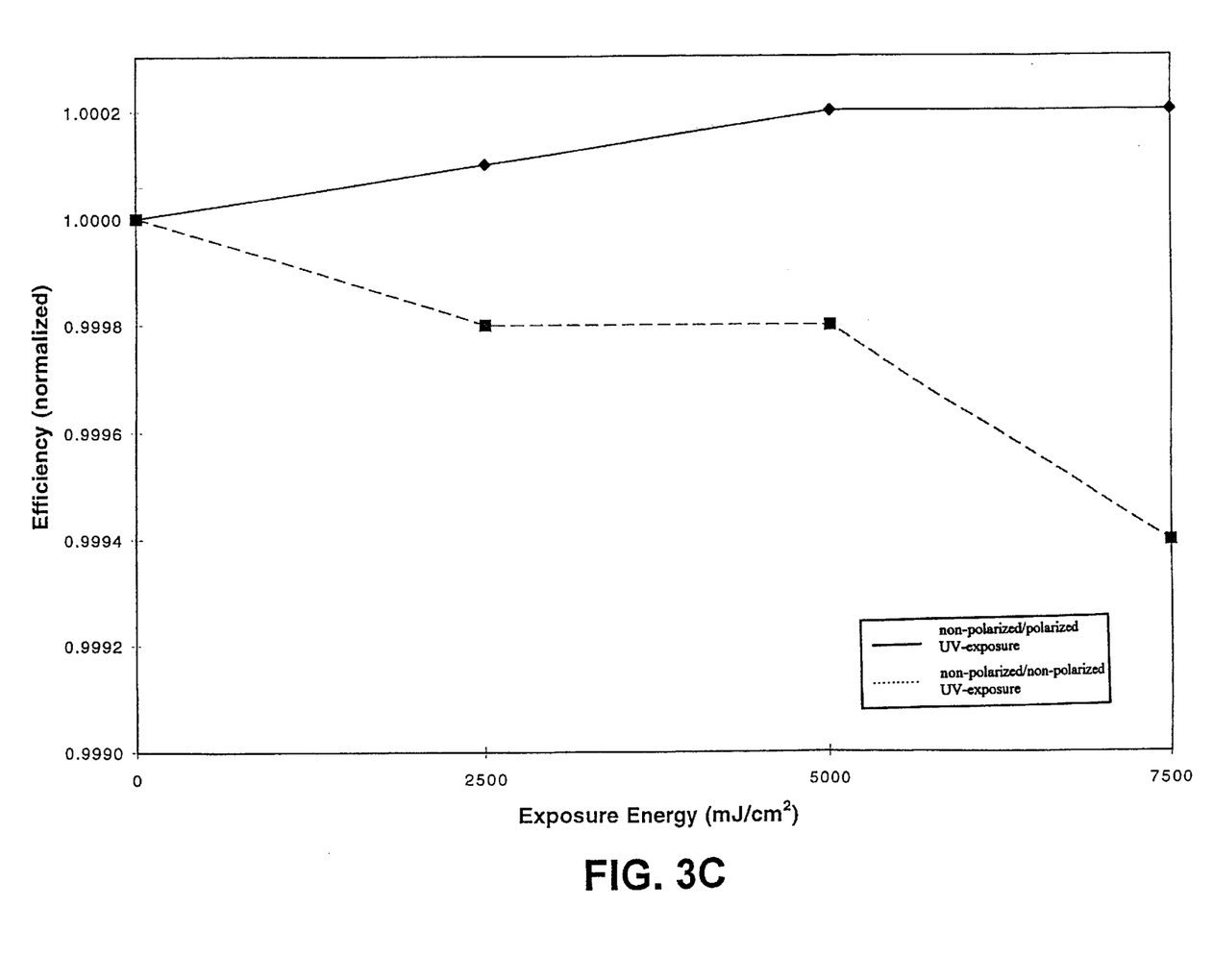

As can be observed from the tables and FIGS. 3A to 3C, the transmittance and dichroic ratio of samples for both UV-irradiation, non-polarized and polarized, increased with increasing duration of the second exposure. Further, as shown in FIG. 3C, the polarizing efficiency of the samples decreased following a second exposure to non-polarized UV-irradiation, but was maintained following a second exposure to polarized UV-irradiation.

Reference Examples 24 to 28

Figure 4:
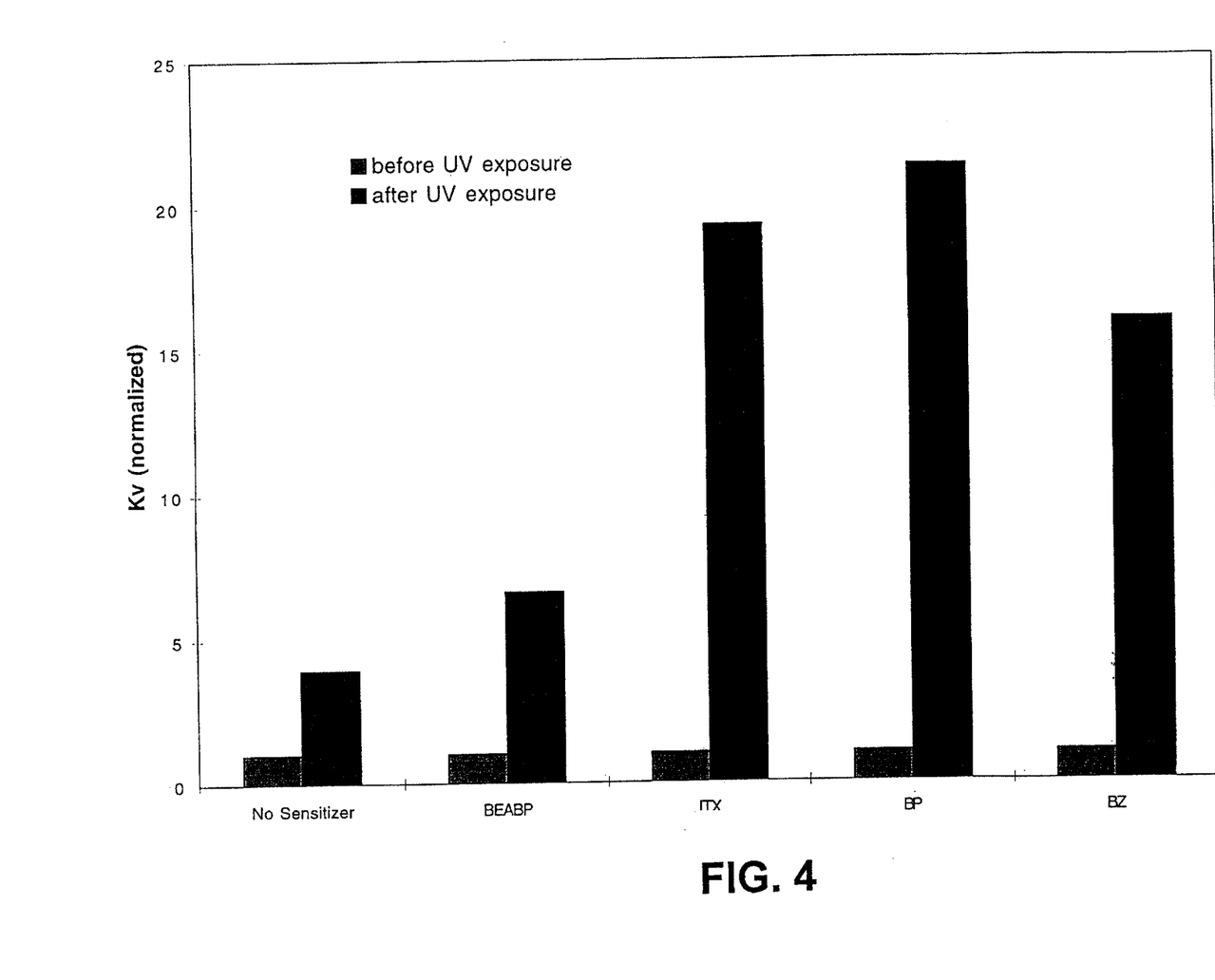
FIG. 4 is a bar graph representing the Kv change of iodine dye-doped polyvinylalcohol films with and without a sensitizer, before and after ultraviolet exposure, and wherein BEABP is 4,4'-bis(diethylamino) benzophenone, ITX is isopropylthioxanthone, BP is benzophenone, and BZ is benzil.

Reference example 24 was made by dipping an unoriented polyvinylalcohol (PVA) film into an iodine ink solution for 10 seconds. Reference example 25 was made by dipping an unoriented PVA film into a 2% solution of 4,4'-bis(diethylamino)benzophenone (BEABP) in methanol for 30 seconds, air dried for 30 minutes, then into the iodine ink solution for 10 seconds. Reference example 26 was made by dipping an unoriented PVA film into a 1% solution of isopropylthioxanthone (ITX) in methanol for 30 seconds, air dried for 30 minutes, then dipped into the iodine ink solution for 10 seconds. Reference example 27 was made by dipping an unoriented PVA film into a 2% solution of benzophenone (BP) in methanol for 30 seconds, air dried for 30 minutes, then dipped into the iodine ink solution for 10 seconds. Reference example 28 was made by dipping an unoriented PVA film into a 2% solution of benzil (BZ) in methanol for 30 seconds, air dried for 30 minutes, then dipped into the iodine ink solution for 10 seconds. All samples were air dried, then exposed to UV-irradiation for 45 minutes. Exposure was effected by the employment of a water-cooled 450 W medium-pressure lamp. The transmittance of the samples was measured before and after exposure to UV-irradiation, with the data being plotted in the graph of FIG. 4. As suggested therein, the rate of UV bleaching can be increased by incorporating photosensitizers into an iodine dye-doped PVA film.

Examples 29 to 30

Example 29 was prepared from a free-standing polarizing sheet HN38 (i.e., an iodine dye-doped polarizing layer supported on one-side by a cellulose triacetate base and available from POLAROID CORPORATION). The polarizing sheet was preheated in a 180° F. oven for 3 minutes, then submitted to a 60° C./90% RH (relative humidity) environment for 25 minutes. Example 30 was also prepared from a sheet of HN38. However, in addition to being preheated and submitted to a 60° C./90% RH environment for 25 minutes, example 30 was exposed for 10 minutes to ultraviolet radiation. The samples were then analyzed for polarizing and other like optical properties, the data collected being presented in the following table and FIGS. 5A to 5C.

|  | Process | $K_1$ | $K_2$ | E | $K_v$ | $D_R$ |
|---|---|---|---|---|---|---|
| Control (HN38) |  | 0.714 | 0.00180 | 99.50 | 35.79 | 24.60 |
| Example 29 | Heat/Humidity only | 0.804 | 0.00149 | 99.63 | 40.27 | 47.68 |
| Example 30 | Heat/Humidity + UV | 0.828 | 0.00113 | 99.73 | 41.46 | 63.61 |

Figure 5A:
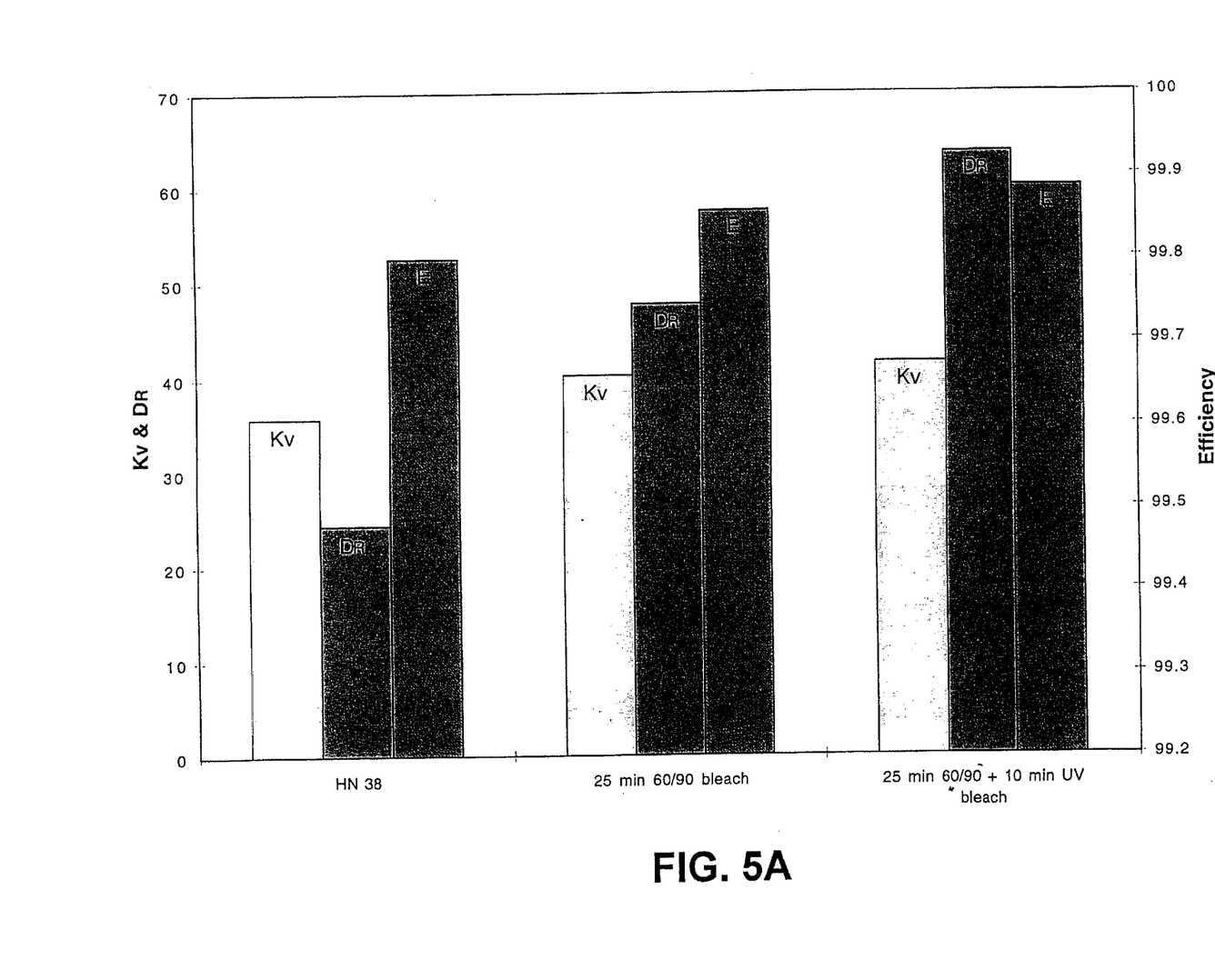
FIGS. 5A to 5C are graphs representing the optical and polarizing properties of several UV-bleached H-type polarizers, wherein bleaching of certain of the polarizers is effected by a combination of exposure to non-polarized ultraviolet irradiation and prolonged exposure to heat and humidity.
Figure 5B:
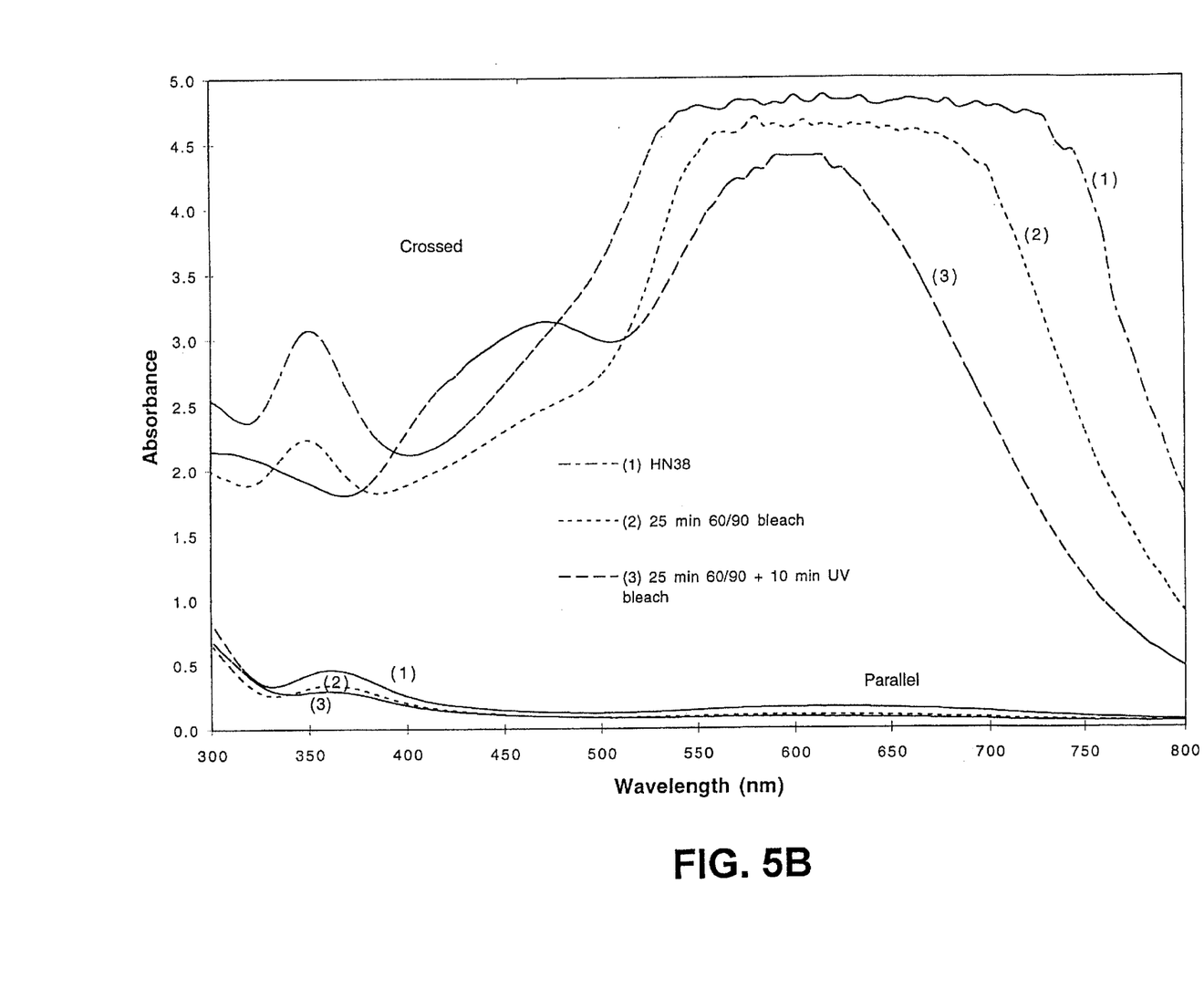
Figure 5C:
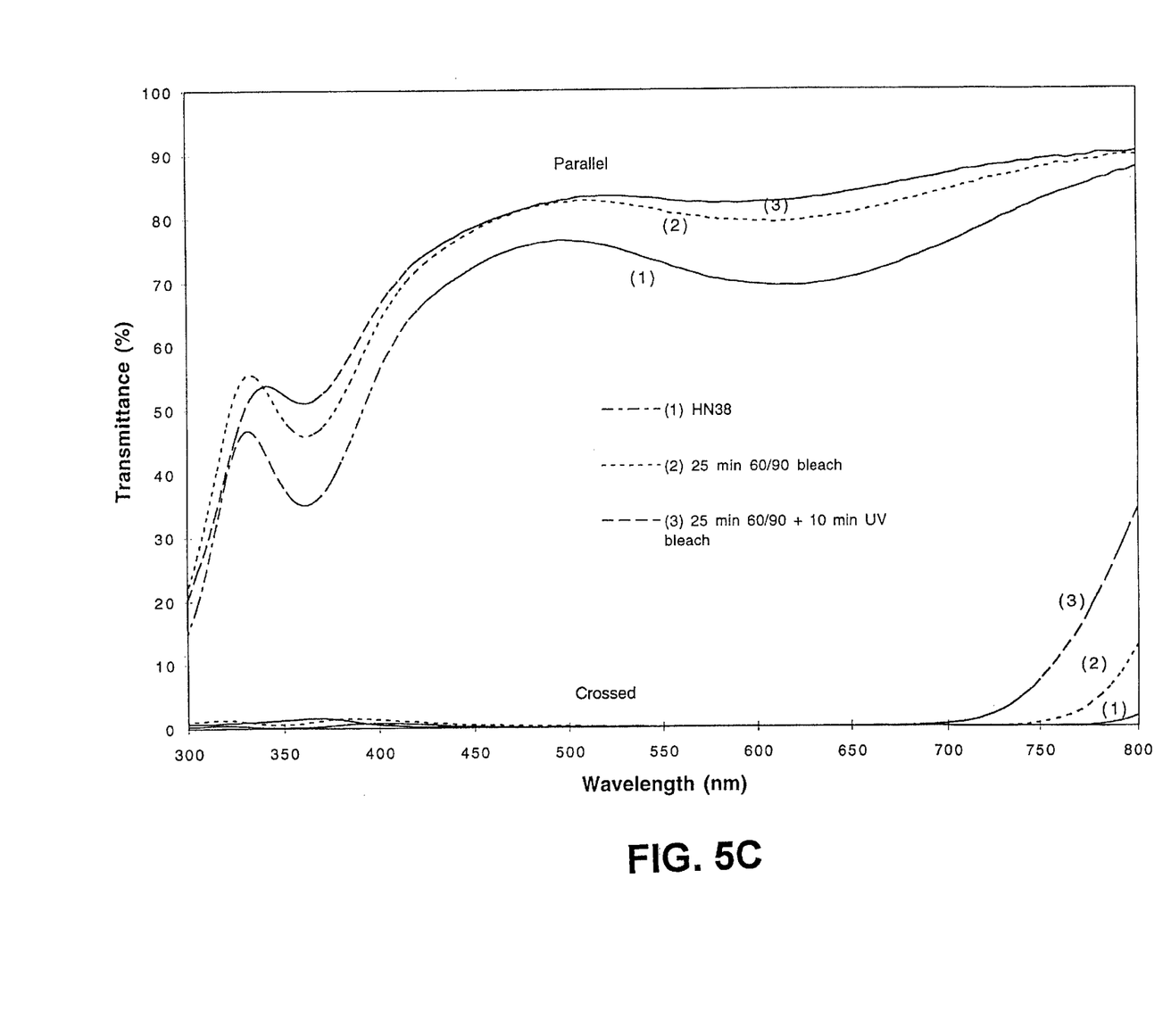

As can be observed from the table and FIGS. 5A to 5C, bleaching by exposure to heat and humidity can increase the transmittance of a dichroic polarizing sheet without reducing polarizing efficiency, but produces substantial "blue leak". However, additional UV-bleaching can be employed to resolve the blue leak problem, as well as further increase transmittance and polarizing efficiency, e.g., from 35.8% to 41.5% and from 99.5% to 99.7%, respectively.

We claim:

1. A method for making a synthetic dichroic light polarizer comprising the steps of:
   (a) providing a sheet of amorphous polymeric material;
   (b) converting the amorphous polymeric sheet into a linear light-polarizing sheet by unidirectionally stretching said amorphous polymeric sheet at a temperature at or above the glass transition temperature of the polymeric sheet material, dichroic moieties being introduced into said sheet before or after said unidirectional stretching, said stretching orienting the molecules of the sheet along the direction of the uniaxial stretch; and
   (c) irradiating the light-polarizing sheet with linearly polarized ultraviolet light at an intensity and duration sufficient to effect bleaching of said light polarizing sheet, the polarizing axis of said polarized ultraviolet light corresponding to the polarizing axis of said light-polarizing sheet.

2. The method of claim 1, wherein said amorphous polymeric material comprises a hydroxylated linear high polymer, and wherein the introduction of said dichroic moieties into said sheet is accomplished by staining said sheet with a dichroic dye.

3. The method of claim 1, wherein said amorphous polymeric material comprises a hydroxylated linear high polymer, and wherein the introduction of said dichroic moieties into said sheet is accomplished by catalytically dehydrating said sheet.

4. The method of claim 1, wherein said amorphous polymeric material comprises a hydroxylated linear high polymer and a guest dye bleachable by exposure to ultraviolet radiation.

5. The method of claim 1, wherein said amorphous sheet further comprises an accelerator dye, said accelerator dye capable of absorbing ultraviolet irradiation and thereby enhancing the rate at which said irradiation effects the linear bleaching of said light-polarizing sheet.

6. A synthetic polarizing element made in accordance with the method of claim 1.

7. A method for making a synthetic dichroic light polarizer comprising the steps of:
   (a) providing a sheet of amorphous polymeric material;

(b) converting the amorphous polymeric sheet into a linear light-polarizing sheet by unidirectionally stretching said amorphous polymeric sheet at a temperature at or above the glass transition temperature of a polymeric sheet material, dichroic moieties being introduced into said sheet before or after said unidirectional stretching, said stretching orienting the molecules of the sheet along the direction of the uniaxial stretch; and (c) irradiating the light-polarizing sheet with ultraviolet light of an intensity of at least 0.01 mW/cm$^2$, to thereby effect bleaching of said light-polarizing sheet.

8. The method of claim 7, wherein said amorphous polymeric material comprises a hydroxylated linear high polymer, and wherein the introduction of said dichroic moiety into said sheet is accomplished by staining said sheet with a dichroic dye.

9. The method of claim 7, wherein said amorphous polymeric material comprises a hydroxylated linear high polymer, and wherein the introduction of said dichroic moiety into said sheet is accomplished by catalytically dehydrating said sheet.

10. The method of claim 7, wherein said amorphous polymeric material comprises a hydroxylated linear high polymer and a guest dye bleachable by exposure to ultraviolet radiation.

11. The method of claim 7, further comprising the step of exposing said light-polarizing sheet to heat and humidity sufficient to effect bleaching of said light-polarizing sheet.

12. The method of claim 7, wherein said amorphous sheet further comprises an accelerator dye, said accelerator dye capable of absorbing ultraviolet irradiation and thereby enhancing the rate at which said irradiation effects the linear bleaching of said light-polarizing sheet.

13. A synthetic polarizing element made in accordance with the method of claim 7.

* * * * *